United States Patent Office 3,799,964
Patented Mar. 26, 1974

3,799,964
UREA DERIVATIVES, A METHOD OF PRO-
DUCING THEM AND PREPARATIONS WHICH
CONTAIN THE NEW SUBSTANCES AS ACTIVE
INGREDIENTS
Jan Johannes van Daalen and Jasper Daams, Weesp,
Netherlands, assignors to U.S. Philips Corporation, New
York, N.Y.
No Drawing. Continuation-in-part of abandoned application Ser. No. 61,402, Aug. 5, 1970. This application June 13, 1972, Ser. No. 262,331
Claims priority, application Netherlands, Aug. 13, 1969,
6912348
Int. Cl. C07c 127/18
U.S. Cl. 260—453 R    7 Claims

ABSTRACT OF THE DISCLOSURE

It has been found that new urea derivatives have strong biocidal effects on plants. The compounds are capable of heavily damaging or destroying not only dicotyledonous weeds but also several monocotyledonous weeds, whereas various monocotyledonous plants suffer no injury due to the use of the new active compounds. Owing to their activity the compounds are particularly suitable for selective control of weeds, mainly monocotyledonous weeds. A strongly active compound is 3-(4-cyclopropylphenyl)-1,1-dimethyl urea.

---

This application is a continuation-in-part of United States patent application Ser. No. 61,402, filed Aug. 5, 1970 now abandoned.

It has been found that compounds of the general formula

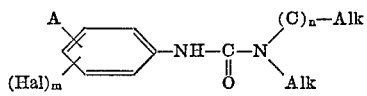

where

A is acycloalkyl group containing 3 or 4 carbon atoms,
Hal is a halogen atom,
Alk is an alkyl group containing from 1 to 4 carbon atoms,
$n=0$ or 1 and
$m=0$ or 1, have strong biocidal effects on plants.

The compounds according to the invention are especially active against dicotyledonous plants. Surprisingly, it has also been found that the monocotyledonous weeds knot grass, annual meadow grass, slender foxtail, millet and wild oat can be effectively controlled by means of T compounds according to the invention, whereas the monocotyledonous plants oat, wheat, rye, barley, rice, maize and leek are substantially not attacked by the substances according to the invention.

It has further been found that the dicotelydonous cultivated plants celery and cotton also do not suffer appreciable damage by the use of the substances according to the invention.

The activity of the substances has been found in biologic evaluation investigations which included the following experiments.

About forty species of plants, such as rice, oat, rye, wheat, barley, leek, maize, celery, cotton, knot grass, annual meadow grass, slender foxtail, millet, wild oat, chickweed, stringing nettle, groundsel, amaranth, black bindweed, corn spurry, camomile, shepherd's pouch, orach, plantain, sorrel, phacelia, common garden-cress, lupin, sunflower, frenchweed, spotted persicary and black nightshade, have been treated both in the glasshouse and in the field with acetonic solutions or aqueous dispersions of the substances according to the invention in dosages of ¼, ½, 1, 2, 3, 4, 5 and 10 kg. of active material per hectare.

After a few weeks it is ascertained whether the plants have been damaged and, if so, in what degree. From the results one may conclude that the cultivated plants rice, oat, rye, wheat, barley, leek, maize and celery are substantially not damaged by the substances according to the invention, even at dosages of from 2 to 3 kg. of active material per hectare, which dosages are comparatively high for these substances. It has been found that at a dosage of 3 kg. per hectare cotton is appreciably damaged, however at a dosage of 1 kg. of active substance per hectare the damage is slight. The weeds chickweed, stinging nettle, groundsel, amaranth, black bindweed, corn spurry, camomile, shepherd's pouch, orach, plantain, sorrel, phacelia, common garden-cress, lupin, sunflower, frenchweed, spotted persicary, black nightshade, knot grass, annual meadow grass, slender foxtail, millet and wild oat are effectively controlled by the substances according to the invention, heavy damage or even destruction occurring at a dosage of from ¼ to 1 kg. of active material per hectare.

In a second series of experiments seeds of various plants, such as white mustard, annual meadow grass, chickweed, millet and common garden-cress have been treated with acetonic solutions or aqueous suspensions of the substances according to the invention in a dosage corresponding to 10 kg. of active material per hectare.

After some time it is ascertained whether, and, if so, in what percentage the treated seed has germinated and also whether the plants springing from the seed show damage or growth retardation. The results show that the compounds according to the invention do not influence the germination of seed. However, growth inhibition and injury of the plants developed from the seed have been observed.

From the biological investigations it has been found in particular that compounds which correspond to the formula

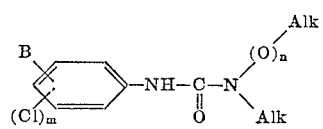

where B represents a cyclopropyl group at position 3 or 4 of the phenyl ring,
Alk is a methyl or ethyl group,
$m=0$ or 1, and
$n=0$ or 1, have the best biocidal activity.

Examples of strongly active compounds are given in the following table.,

Compound of the formula

| Q | Alk | $n$ | Melting point in ° C. |
|---|---|---|---|
| 4-cyclopropyl | —CH₃ | 0 | 152–152.5 |
| Do | —C₂H₅ | 0 | 84–85 |
| Do | —CH₃ | 1 | 99–101 |
| 3-cyclopropyl | —CH₃ | 0 | 146–148 |
| 2-Cl-3-cyclopropyl | —CH₃ | 0 | 81–85 |

The compounds according to the invention can be used for weed control owing to their biological activity.

This permits selective control of weeds, mainly, monocotyledonous plants. As has been stated hereinbefore, it is to be regarded as highly surprising that the compounds according to the invention are capable of affecting not only the dicotyledonous weeds but also several monocotyledonous weeds growing among cultivated plants without injury to the latter.

A use of the compounds according to the invention which is of great interest for practice is the control of weeds, including the monocotyledonous weeds wild oat and slender foxtail, in cereals.

For practical use the compounds according to the invention are worked up into the usual preparations. Examples of formulations according to the invention are dusts, wettable powders, miscible oils, invert emulsions, oil solutions, oil dispersions, granules, fumigating candles and aerosol preparations.

In all these preparations the active substance is mixed with, or dissolved or dispersed in, a solid or liquid carrier material, if required in the presence of adjuvants, for example surface-active substances, adhesives, binders, lubricants and disintegrating agents. Wettable powders and miscible oils are preparations in concentrated form which are diluted with water before or during use.

The invert emulsions are mainly used for air application, large areas being treated with comparatively small amounts of preparation. The invert emulsion can be prepared by emulsifying water in an oil solution or an oil dispersion of the active substance in the spraying apparatus shortly before, or even during, spraying. Hereinafter a few formulations, given by way of example, will be described more fully, and it should be noted that the preparation of these and similar known compositions will not provide difficulty to one skilled in the art.

Granular preparations are produced, for example, by absorbing the active substance in a solvent, the resulting solution, as the case may be in the presence of a binder, being used to impregnate a granular carrier material, such as porous granules (for example pumice and attaclay), mineral non-porous granules (sand or ground marl), organic granules (for example dried coffee grounds and cut tobacco stems).

A granular preparation may alternatively be produced by compressing the active substance together with powdered minerals in the presence of lubricants and binders, the pressings being disintegrated and strained to the desired grain size.

Dusts are obtainable by intimately mixing the active substance with an inert solid carrier material, for example in a concentration of from 1% to 50% by weight. Examples of suitable carrier materials are talcum, kaolin, pipe clay, diatom earth, dolomite, gypsum, chalk, bentonite, attapulgite and colloidal $SiO_2$ or mixtures of these and similar substances. Organic carrier materials such as, for example, ground walnut shells may also be used.

Wettable powders may be prepared by mixing from 10 to 80 parts by weight of a solid inert carrier such as, for example, one of the above-mentioned carrier materials with from 10 to 80 parts by weight of the active substance, from 1 to 5 parts by weight of a dispersing agent such as, for example, the lignin sulfonates or alkylnaphthalene sulfonates known for this purpose, and preferably also from 0.5 to 5 parts by weight of a wetting agent such as one of the fatty alcohol sulfates, alkylaryl sulfonates or fatty acid condensation products, for example these known under the trademark Igepon.

For the production of miscible oils the active compound is dissolved, or finely divided, in a suitable solvent, which preferably is poorly miscible with water, an emulsifier being added to the solution. Suitable solvents are, for example, xylene, toluene, high-aromatic petroleum distillates, for example solvent naphtha, distilled tar oil and mixtures of these liquids. Suitable emulsifying agents are, for example, alkylphenoxypolyglycolethers, polyoxyethylenesorbitan esters of fatty acids or polyoxyethylenesorbitol esters of fatty acids. The concentration of the active compound in these miscible oils is not restricted within narrow limits and may vary between 2% and 50% by weight. In addition to a miscible oil there may be mentioned as a liquid and highly concentrated primary composition a solution of the active substance in a liquid which is satisfactorily miscible with water, for example acetone, to which solution a dispersing agent and, as the case may be, a wetting agent is added. On dilution with water shortly before, or during, spraying an aqueous dispersion of the active substance is obtained.

An aerosol preparation according to the invention is obtained in the usual manner by incorporating the active substance, if required in the form of a solution, in a volatile liquid to be used as a propellant such as, for example, the mixture of chlorine and fluorine derivatives of methane and ethane commercially available under the trade-name "Freon."

Fumigating candles or fumigating powders, i.e. preparations which are capable of developing a pesticidal smoke when burning, are obtained by absorbing the active substance in a combustible mixture which, for example, may contain a sugar or wood, preferably in the ground form, as a fuel, a substance to maintain combustion such as, for example, ammonium nitrate or potassium chlorate, and further a substance to retard combustion, for example kaolin, bentonite and/or colloidal silicic acid.

In addition to the above-mentioned ingredients the preparations according to the invention may contain further substances which are known for use in such preparations.

For example, to a wetting powder or a mixture to be granulated a lubricant such as a calcium or magnesium stearate may be added. Also "adhesives" such as polyvinylalcoholcellulose derivatives or other colloidal materials such as casein may be added to improve the adherence of the pesticide to the surface to be treated.

Further, known herbicidal compounds may be included in the preparations according to the invention. This ensures that the spectrum of activity of such a combination preparation is widened and synergy may be obtained. Since the compounds according to the invention exerts substantially no herbicidal activity on the seeds of plants (pre-emergence effects), it may be of interest to include a known substance having pre-emergence herbicidal activity in the preparations according to the invention.

The following known herbicidal compounds are suitable for inclusion in the preparations according to the invention:

Quaternary herbicides such as:

1,1'-ethylene-2,2'-dipyridylium-dibromide (diquat)
1,1'-dimethyl-4,4'-dipyridylium-dibromide (paraquat)

Triazines such as:

2-chloro-4,6-bis(ethylamino)-s-triazine (simazine)
2-chloro-4-ethylamino-6-isopropylamino-s-triazine (atrazine)
2-chloro-4,6-bis(isopropylamino)-s-triazine (propazine)

Urea derivatives such as:

1-phenyl-3,3-dimethylurea (fenuron)
1-(4'-chlorophenyl)-3,3-dimethylurea (monuron)
1-(4'-chlorophenyl)-3,3-methoxy-3-methylurea (monolinuron)
1-(4'-chlorophenyl)-3-[3-(butyn-1)]-3-methylurea (buturon)
1-(4'-bromophenyl)-3-methoxy-3-methylurea (metobromuron)
1-(3',4'-dichlorophenyl)-3,3-dimethylurea (diuron)
1-(3',4'-dichlorophenyl)-3-methoxy-3-methylurea (linuron)

1-(3',4'-dichlorophenyl)-3-butyl-3-methylurea (neburon)
1-(3'-chloro-4'-bromophenyl)-3-methoxy-3-methylurea (C 6313)
1-(3'-trifluoromethylphenyl)-3,3-dimethylurea (fluometuron)

Phenols such as:

2,6-dichloro-4-cyanophenol (chloroxynil)
2,6-dibromo-4-cyanophenol (bromoxynil)
2,6-diiodo-4-cyanophenol (ioxynil)
4,6-dinitro-orthocresol (DNOC)
2-sec.butyl-4,6-dinitrophenol (dinoseb)
pentachlorophenol (PCP)

Chlorinated fatty acids:

monochloroacetic acid (SMCA)
trichloroacetic acid (TCA)
α,α-dichloropropionic acid (delapon)
α,α,α-trichloropropionic acid (TCP)

Mixed:

3-amino-1,2,4-triazole (amitrol)
3,6-endoxo hexahydrophthalic acid (endothal)
maleic acid hydrazide (MH)
2,3,6-trichlorobenzoic acid (TBA)
2-methoxy-3,6-dichlorobenzoic acid (dicamba)
1-(3',4'-dichlorophenyl)-3-methyl-3-pyrrolidinon (BV 201)
1-(3'-chloro-4'-methylphenyl)-3-methyl-2-pyrrolidinon (BV 207),
N,N-dimethyl-2,2-diphenylacetonide (diphenamide)
2,3,5-trichloropyridon-4 (daxtron)
4-amino-3,5,6-trichloro-α-picolinic acid (tordon)
5-amino-4-chloro-2-phenyl-3(2H)-pyridazinon (Pyramin)
3-cyclohexyl-5,6-trimethylene uracil (lenacil)
2,6-dinitro-N,N-dipropyl-a,a,a-trifluoro-p-toluidine (trifluralin)
2,6-dinitro-4-methylsulphonyl-N,N-dipropylaniline (Planadin)
5-bromo-6-methyl-3-(1-methylpropyl)uracil (bromacil)
3-amino-2,5-dichlorobenzoic acid (amiben)
2,3,6-trichlorophenylacetic acid (fenac)
2,6-dichloro-3-methoxybenzoic acid (mediben)
N-(3-chlorophenyl)-isopropylcarbamate (CIPC)
2,6-dichlorobenzonitrile (dichlobenil).

It should be pointed out that it may be of advantage, especially for controlling weeds in cultivated plants, to include fertilizers in the preparation according to the invention.

The dosage of the preparation according to the invention depends on several factors, such as the active substances used, the formulation, the weed to be controlled and the condition of the cultivated plants. In general a dosage corresponding to from 0.2 to 10 kg. of active material per hectare will yield good results. As a rule a dosage of at most 5 kg. of active material per hectare will be sufficient.

The compounds according to the invention are novel substances which may be produced by methods which are known for preparing similar substances or by related methods. Thus, the compounds according to the invention may be produced by reacting a compound of the formula $$\underset{(Hal)_m}{A}\diagdown\!\!\!\diagup\!\!\!-NH_2$$

where

A is a cycloalkyl group containing 3 or 4 carbon atoms,
Hal is a halogen atom and
$m=0$ or 1,
with a compound of the formula $$Cl-\underset{\underset{O}{\|}}{C}-N\diagup^{(O)_n-Alk}_{\diagdown Alk}$$

where

Alk is an alkyl group containing from 1 to 4 carbon atoms and
$n=0$ or 1.

The reaction is performed in the presence of a substance capable of binding the HCl evolved. Preferably the reaction medium also includes a solvent. Suitable solvents are, for example, aliphatic and aromatic hydrocarbons, such as pentane and benzene, chlorinated hydrocarbons, such as chlorobenzene and carbon tetrachloride, polar aprotic solvents, such as dimethylsulfoxide and dimethylformamide, ethers, such as diethylether, and acetone nitrile. Suitable acid binders are inorganic and organic bases, such as sodiumbicarbonate, pyridine and collidine.

The reaction temperature may vary between 0° C. and 50° C. and preferably is about equal to room temperature.

According to another method the compounds according to the invention are obtainable by reacting a compound of the formula $$\underset{(Hal)_m}{A}\diagdown\!\!\!\diagup\!\!\!-N=C=O$$

where

A is a cycloalkyl group containing 3 or 4 carbon atoms,
Hal is a halogen atom and
$m=0$ or 1,
with a compound of the formula $$Alk-(O)_n-NH-Alk$$

where

Alk is an alkyl group containing from 1 to 4 carbon atoms and
$n=0$ or 1.

The reaction is carried out in the presence of solvents. Examples of suitable solvents are aliphatic and aromatic hydrocarbons, such as pentane and benzene, chlorinated hydrocarbons, such as chlorobenzene and carbon tetrachloride, polar aprotic solvents, such as dimethylsulfoxide, ethers, such as diethylether, and acetonitrile.

The reaction temperature may vary between 0° C. and 50° C. and preferably is about equal to room temperature.

The starting products for the aforesaid method are obtainable by a series of reactions which hereinafter have been represented by reaction equations:

$$\underset{(Hal)_m}{A}\diagdown\!\!\!\diagup\!\!\!-NH_2 + Alk-N=C=O \longrightarrow$$
(A)

$$\underset{(Hal)_m}{A}\diagdown\!\!\!\diagup\!\!\!-NH-\underset{\underset{O}{\|}}{C}-NH-CH_3 + COCl_2 \longrightarrow$$
(B)

$$\underset{(Hal)_m}{A}\diagdown\!\!\!\diagup\!\!\!-NH-\underset{\underset{O}{\|}}{C}-N\underset{\underset{O}{\overset{|}{C}-Cl}}{-CH_3} \xrightarrow{heating}$$
(C)

$$\underset{(Hal)_m}{A}\diagdown\!\!\!\diagup\!\!\!-N=C=O$$
(D)

In the above reaction equations A, Hal, Alk and m have the aforementioned meanings.

The invention will now be described in greater detail with reference to the following examples.

EXAMPLES

1.—Preparation of 3-(4-cyclopropylphenyl)-1,1-dimethyl urea 13.3 g. of 4-cyclopropylaniline is dissolved in 50 ml. of acetonitrile. 9 ml. of pyridine and 12.9 g. of dimethylcarbamoylchloride are added and the mixture is stirred at room temperature for 40 hours. The red-colored solution is poured into 250 ml. of icewater and acidified with 2 N hydrochloric acid to a pH of from 2 to 3. The resulting precipitate is drawn off, dried and crystallized from benzene. Yield 12.4 g. Melting point 152°–152.5° C.

In a manner analogous to that described above the compounds listed in Column 3 of the following table have been synthesized. Columns 1 and 2 of the table show the starting substances.

In the case of the starting substance 2-chloro-3-cyclopropyl-aniline this compound may be prepared according to methods known in the art or according to the following reaction scheme starting with 2'-cyclopropyl-acetanilide (a compound described in J.A.C.S. 90, 3404–3415 (1968):

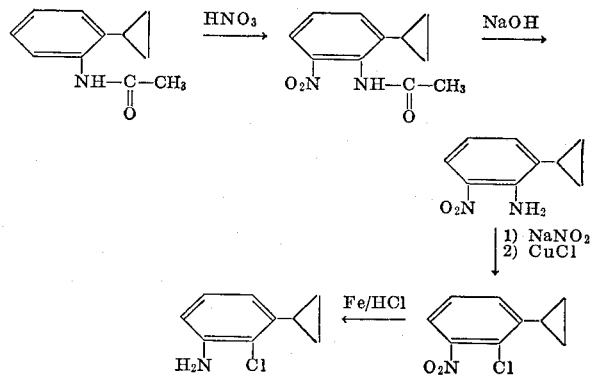

and made alkaline by addition of 1560 ml. of 50%-sodium-hydroxide solution. The formed precipitate was sucked off, washed with water and diethylether until the filtrate was colorless. After drying and recrystallization from benzene 28.5 g. of the subject compound were obtained. Melting point is 150° C.

(b) 2-cyclopropyl-6-nitro-aniline.—61.1 g. of 2'-cyclopropyl-6'-nitro-acetanilide were dissolved in 425 ml. of ethanol, and to this solution a solution of 22.5 g. sodium hydroxide in 50 ml. of water was added. After refluxing for 7 hours the ethanol was almost distilled off in vacuo and the remaining reaction mixture poured out into 3000 ml. of water. The orange-red precipitate was sucked off, washed with water and dried. Yield 42 g. Melting point 68° C.

(c) 2-chloro-3-cyclopropyl-nitrobenzene.—7.12 g. of 2-chloropropyl-6-nitro-aniline were dissolved, while heating in 120 ml. of concentrated hydrochloric acid. The solution was cooled and at 0° C. during ten minutes a solution of 2.8 g. of sodiumnitrite in 10 ml. of water was added dropwise. To the obtained clear solution, a solution of 8 g. of cuprochloride in 180 ml. of concentrated hydrochloric acid was added. Under protection of nitrogen a precipitate was formed. The precipitate was sucked off, washed with water and dried. A yield of 6.84 g. of the subject compound was obtained. After recrystallization from petroleum-ether (40–60) the melting point was 40.5–42° C.

(d) 2-chloro-3-cyclopropyl-aniline.—4.7 g. of 2-chloro-3-cyclopropyl-nitrobenzene were dissolved in 35 ml. of methanol. To this solution were added subsequently 19 ml. of concentrated hydrochloric acid and 6.2 g. of iron-powder in small portions at 50–60° C. while stirring. After cooling a greyish precipitate was formed. To the reaction mixture water and thereafter diethylether were added. The ether layer was removed. The water layer was extracted with ether. The ether solutions were combined, dried on $Na_2SO_4$ and filtered. The diethylether was subsequently distilled off in vacuo. 3.65 g. of an oily product were obtained. After distillation in vacuo 2.83 g. of the subject product were obtained with B.P. of 94–95° C. at 0.2 mm. Hg.

| Starting substance | Starting substance | Final product | Melting point of the final product in ° C. |
|---|---|---|---|
| 4-cyclopropylaniline | Diethylcarbamoylchloride | 3-(4-cyclopropylphenyl)-1,1-diethylurea | 84–85 |
| Do | Dibutylcarbamoylchloride | do | 56 |
| Do | Methylmethoxycarbamoylchloride | 3-(4-cyclopropylphenyl)-1-methoxy-1-methylurea | 99–101 |
| 2-cyclopropylaniline | Dimethylcarbamoylchloride | 3-(2-cyclopropylphenyl)1,1-dimethylurea | 96–97 |
| 3-cyclopropylaniline | do | 3-(3-cyclopropylphenyl)1,1-dimethylurea | 146–148 |
| 2-chloro-3-cyclopropylaniline | do | 3-(2-chloro-3-cyclopropyl)-phenyl-1,1-dimethylurea | 81–85 |
| 4-cyclobutylaniline | do | 3-(4-cyclobutylphenyl)1,1-dimethylurea | 186–188 |

Examples showing the preparation of 2-chloro-3-cyclopropyl-aniline (a) 2'-cyclopropyl-6'-nitro-acetanilide.—76 g. of 2'-cyclopropyl-acetanilide were dissolved in 900 ml. of acetic acid anhydride. The solution was cooled till 0° C. and a solution of 19 ml. of fuming nitric acid in 30 ml. of acetic anhydride was added, dropwise, at 0–5° C., during 15 minutes to the said cooled solution. After mixing for three hours at 0° C., the reaction mixture was poured onto ice 2.—From the active substances obtained as described in Example 1, wettable powders have been prepared by mixing 50 parts by weight of the active substance with 1.5 parts by weight of dibutylnaphthalenesulfonate, 3.5 parts by weight of sodiumligninsulfonate, 30 parts by weight of kieselguhr and 15 parts by weight of kaolin.

3.—A miscible oil is obtained by mixing 25 parts by weight of the active substance obtained as described in Example 1 with 5 parts by weight of a mixture (1:1) of alkylphenolpolyglycolether and calciumdodecylbenzenesulfonate, the resulting mixture being taken up in 70 parts by weight of xylene.

What is claimed is:

1. Compounds of the general formula

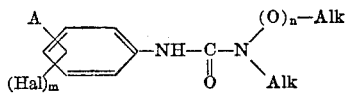

where

A is a cycloalkyl group containing 3 to 4 carbon atoms,
Hal is a halogen atom,
Alk is an alkyl group containing from 1 to 4 carbon atoms,
$n = 0$ or 1, and
$m = 0$ or 1.

2. A compound of claim 1 wherein A represents a cyclopropyl group at position 3 or 4 of the phenyl ring
Hal is a chlorine atom,
Alk is a methyl or ethyl group,
$m = 0$ or 1, and
$n = 0$ or 1.

3. As a compound of claim 1, 3-(4-cyclopropylphenyl)-1,1-dimethyl urea.

4. As a compound of claim 1, 3-(4-cyclopropylphenyl)-1,1-diethyl urea.

5. As a compound of claim 1, 3-(4-cyclopropylphenyl)-1-methoxy-1-methyl urea.

6. As a compound of claim 1, 3-(3-cyclopropylphenyl)-1,1-dimethyl urea.

7. As a compound of claim 1, 3-(2-chloro-3-cyclopropylphenyl)-1,1-dimethyl urea.

References Cited

UNITED STATES PATENTS 2,050,582  8/1936  Orthner _____ 260—553 A

OTHER REFERENCES

Schmitt et al., Chem. Abstract, vol. 70, col. 47472r (1969).

Hai et al. Chem. Abstracts, vol. 52, cols. 18412–18414 (1958).

BERNARD HELFIN, Primary Examiner

M. W. GLYNN, Assistant Examiner

U.S. Cl. X.R.

260—553 A; 252—355; 71—80, 120